No. 769,510. PATENTED SEPT. 6, 1904.
P. J. SWEENY.
SPOKE.
APPLICATION FILED JULY 2, 1904.
NO MODEL.

Witnesses:
R. H. Butler,
M. E. Lawson.

Inventor
P. J. Sweeny
By N. C. Evert & Co.
Attorneys.

No. 769,510.

Patented September 6, 1904.

UNITED STATES PATENT OFFICE.

PATRICK J. SWEENY, OF ALLEGHENY, PENNSYLVANIA.

SPOKE.

SPECIFICATION forming part of Letters Patent No. 769,510, dated September 6, 1904.

Application filed July 2, 1904. Serial No. 215,103. (No model.)

*To all whom it may concern:*

Be it known that I, PATRICK J. SWEENY, a citizen of the United States of America, residing at Allegheny, in the county of Allegheny and State of Pennsylvania, have invented certain new and useful Improvements in Spokes, of which the following is a specification, reference being had therein to the accompanying drawings.

This invention has relation to spokes for vehicle-wheels, and has for its object the provision of novel means whereby a spoke may be easily and quickly placed in the hub and felly of a wheel.

Another object of my invention is to provide means whereby the spokes may be placed in the hub of a wheel and secured in the felly of the wheel without springing or displacing the rim of the wheel.

Heretofore in placing spokes in a wheel it has been necessary to spring the rim of the wheel to such an extent that the tenon portion can be inserted into the tenon-socket formed in the felly of the wheel, and in performing this operation there is a liability of the felly's breaking, and oftentimes the wheel is distorted and rendered useless for further purposes. In constructing my improved spoke I have provided a movable tenon which when one end of the spoke has been secured in the hub the tenon is placed in alinement with the tenon-socket formed in the felly of the wheel and the same moved outwardly until it has become engaged in said socket, at which time novel means is employed in connection with the spoke for retaining the tenon in a locked position.

Reference will now be had to the accompanying drawings, wherein like numerals of reference will be used to indicate like parts throughout the several views, in which—

Figure 1:
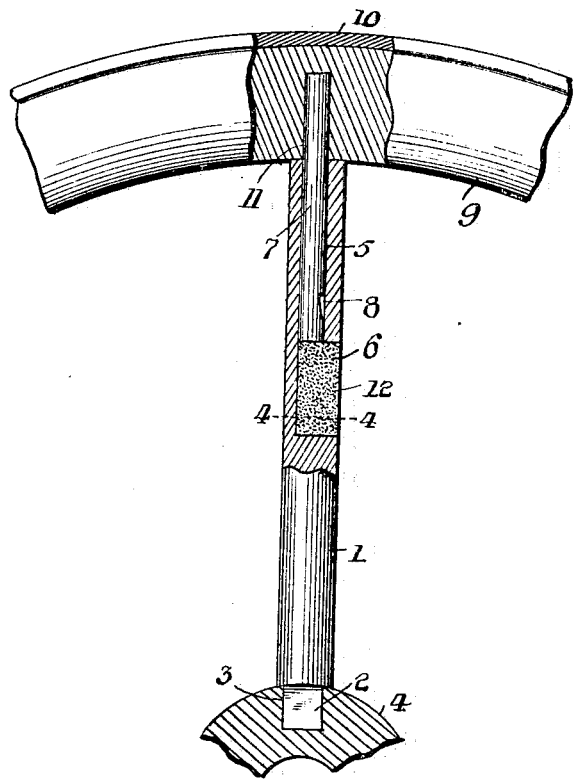
Figure 2:
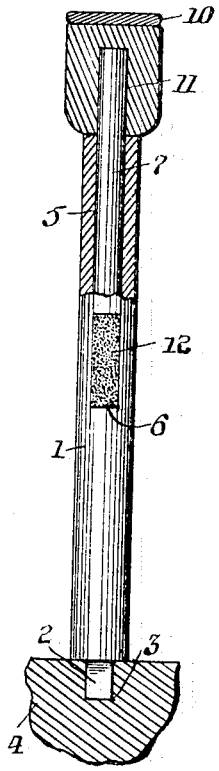
Figure 3:
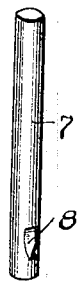
Figure 4:

Figure 1 is a vertical sectional view of the spoke secured in the rim and hub of the wheel, said rim and hub being partly broken away. Fig. 2 is a vertical transverse sectional view of the same, showing a part of the spoke in side elevation. Fig. 3 is a detail perspective view of the tenon. Fig. 4 is a transverse sectional view taken on the line 4 4 of Fig. 1.

To put my invention into practice I employ a spoke 1, which is circular in cross-section, but may be of any desired contour, and upon the lower end of the spoke is formed a tenon 2, which is adapted to fit in a tenon-socket 3, formed in the hub 4 of the wheel. Longitudinally of the length of the spoke and in the outer end thereof I form a bore 5, which is adapted to extend a short distance within the spoke and communicate with the slot 6, formed in the side of the spoke and at right angles to the bore 5. In the bore 5 is mounted a tenon 7, which is preferably cylindrical in form and is of the same length as the bore 5 of the spoke. This tenon on its one side and near its lower end is provided with a cutaway portion 8, forming a notch in which a suitable instrument may be placed in order that the tenon may be raised within the bore 5, formed in the spoke.

The reference-numeral 9 indicates the felly of the wheel, upon which the tire 10 is mounted, this felly being provided with a tenon-socket 11 of a sufficient depth to permit the tenon to firmly engage within the same, the socket being made of the same size in diameter as the tenon. As illustrated in Fig. 1 of the drawings, the tenon is in position in the felly of the wheel, and in order to support the same therein a suitable cement 12 is employed, which is placed in the slot 6 after the tenon 7 has been raised to engage the socket 11, formed in the felly of the wheel. It will thus be observed that in case a spoke of a wheel should become cracked or broken the spoke may be readily removed and a new one placed therein without employing a factory or machinery to accomplish the same, it only being necessary to remove the old spoke by removing the cement from the slot and allowing the tenon to assume a lowered position within the bore 5 of the spoke, at which time the spoke can be manipulated to withdraw the tenon 2 from its socket within the hub. It will also be noted that when a suitable varnish or shellac has been placed upon the spokes of the wheel it will be impossible to detect the cement, and in placing said spokes in the wheel marring and disfiguring of the spokes, which has heretofore been a troublesome feature, will be entirely dispensed with.

While I have herein only shown one of the spokes of a wheel as being constructed in accordance with my invention it will of course be understood that the other spokes of a wheel may be readily constructed upon similar lines and that my improved spoke may be used upon vehicle-wheels wherein wooden spokes are employed, and the tenon 7 may be made of any suitable material, such as aluminium or other light metal that will withstand the pressure exerted upon it and at the same time maintain a construction which will be strong and durable.

Having fully described my invention, what I claim as new, and desire to secure by Letters Patent, is—

1. In combination with the hub of a wheel and the felly thereof, a spoke having a tenon formed on its one end, said spoke having a bore formed therein, a tenon slidably mounted within said bore, and means carried by said spoke for securing said tenon in the felly of the wheel, substantially as described.

2. The combination with the hub of a wheel and the rim thereof, the felly of said rim having a tenon-socket formed therein, of a spoke having a tenon on its one end and adapted to engage in the hub of the wheel, the said spoke having a bore formed therein, a tenon mounted in said bore, a slot communicating with said bore, and means carried within said slot for locking said tenon in the felly of the wheel.

3. The combination with the hub of a wheel and the rim thereof, the felly of said rim having a tenon-socket formed therein, of a spoke having a tenon formed on its one end and adapted to engage in the hub of the wheel, said spoke having a bore formed therein, a tenon slidably mounted within said bore, said spoke having a slot formed therein and communicating with said bore, and means carried within said slot for supporting the tenon in the tenon-slot of the felly of the wheel.

4. In combination with the hub and rim of a wheel, the felly of the rim having a tenon-socket formed therein, of a spoke having a tenon on its one end and adapted to engage in said hub, said spoke having a bore formed in its other end, a tenon slidably mounted within said bore, said spoke having a slot formed therein and communicating with said bore, and cement carried within said slot to retain said tenon in the tenon-slot of the felly of a wheel, substantially as described.

In testimony whereof I affix my signature in the presence of two witnesses.

PATRICK J. SWEENY.

Witnesses:
M. E. LAWSON,
K. H. BUTLER.